(12) United States Patent
Lin et al.

(10) Patent No.: US 8,147,114 B2
(45) Date of Patent: Apr. 3, 2012

(54) BACKLIGHT MODULE

(75) Inventors: Yu-Sheng Lin, Hsinchu (TW); Wan-Ten Chen, Hsinchu (TW); Chih-Hua Cheng, Hsinchu (TW); Yi-Ting Chen, Hsinchu (TW); Yung-Ta Huang, Hsinchu (TW); Shin-Yi Hsieh, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 151 days.

(21) Appl. No.: 12/699,030

(22) Filed: Feb. 2, 2010

(65) Prior Publication Data

US 2011/0051398 A1   Mar. 3, 2011

(30) Foreign Application Priority Data

Sep. 1, 2009   (TW) ................................ 98129460 A

(51) Int. Cl.
 *F21V 7/04*   (2006.01)
(52) U.S. Cl. ......... 362/631; 362/27; 362/97.3; 362/612; 362/613; 362/630; 349/65; 349/68
(58) Field of Classification Search .................... 362/27, 362/97.3, 612, 613, 630, 631; 349/65, 68
See application file for complete search history.

(56) References Cited

U.S. PATENT DOCUMENTS

2006/0256579 A1\* 11/2006 Yang et al. ..................... 362/613
2007/0091639 A1\* 4/2007 Yoo .............................. 362/612

\* cited by examiner

*Primary Examiner* — Stephen F Husar
(74) *Attorney, Agent, or Firm* — Chun-Ming Shih

(57) ABSTRACT

A backlight module includes a light guide plate and a flexible illuminating bar. The light guide plate has a light emitting top surface and a plurality of light incident side surfaces. Each of the light incident side surfaces is connected to the light emitting top surface. The flexible illuminating bar includes a circuit board module and a plurality of point light sources. The circuit board module includes a plurality of circuit boards and at least one flexible electrical connection member. The circuit boards are disposed at the light incident side surfaces, respectively. The flexible electrical connection member electrically connects two of the circuit boards and is bendingly disposed between corresponding two of the circuit boards. The point light sources are electrically disposed on the circuit boards and suitable for emitting light towards the light incident side surfaces. In addition, another backlight module is also provided.

8 Claims, 4 Drawing Sheets

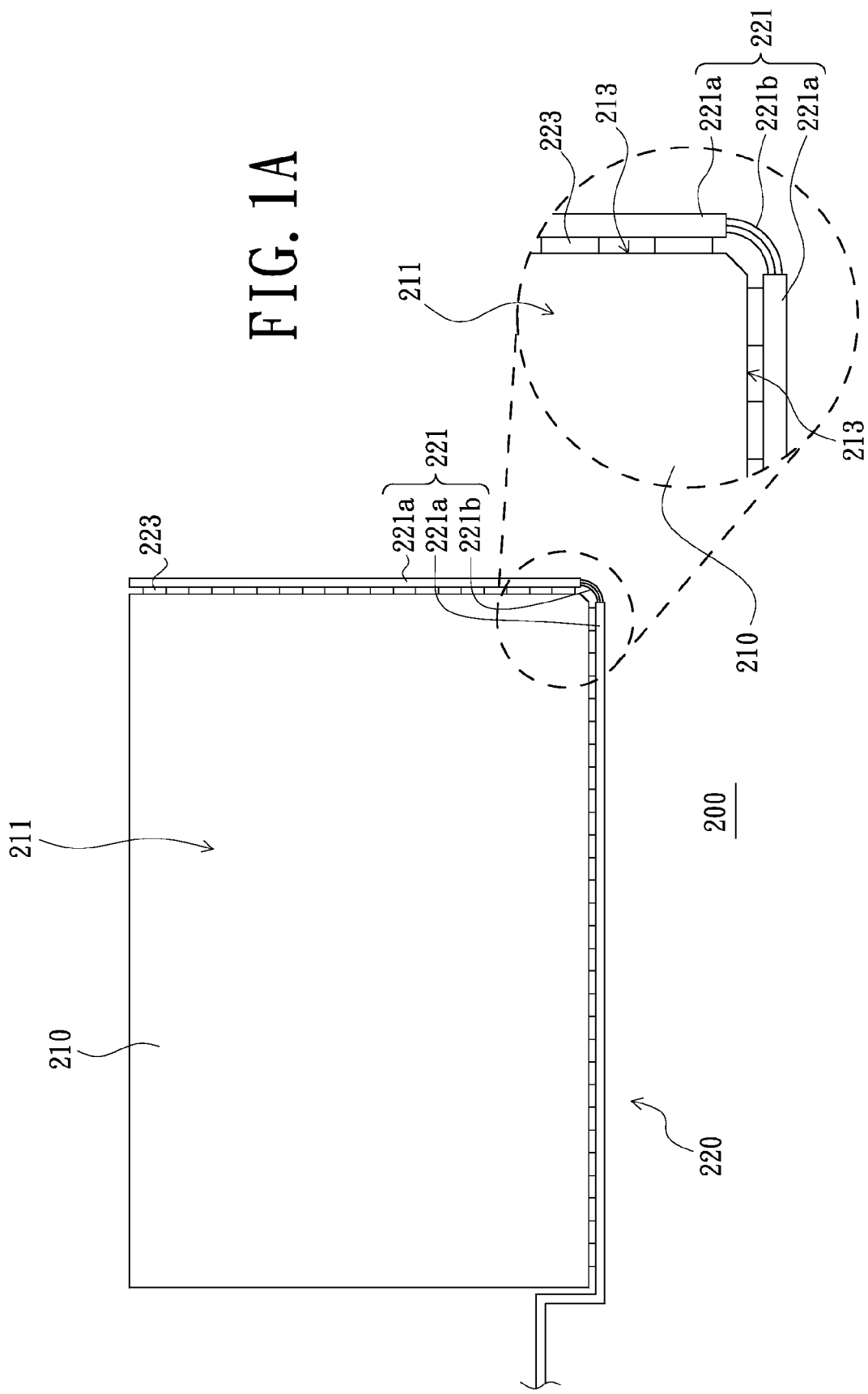

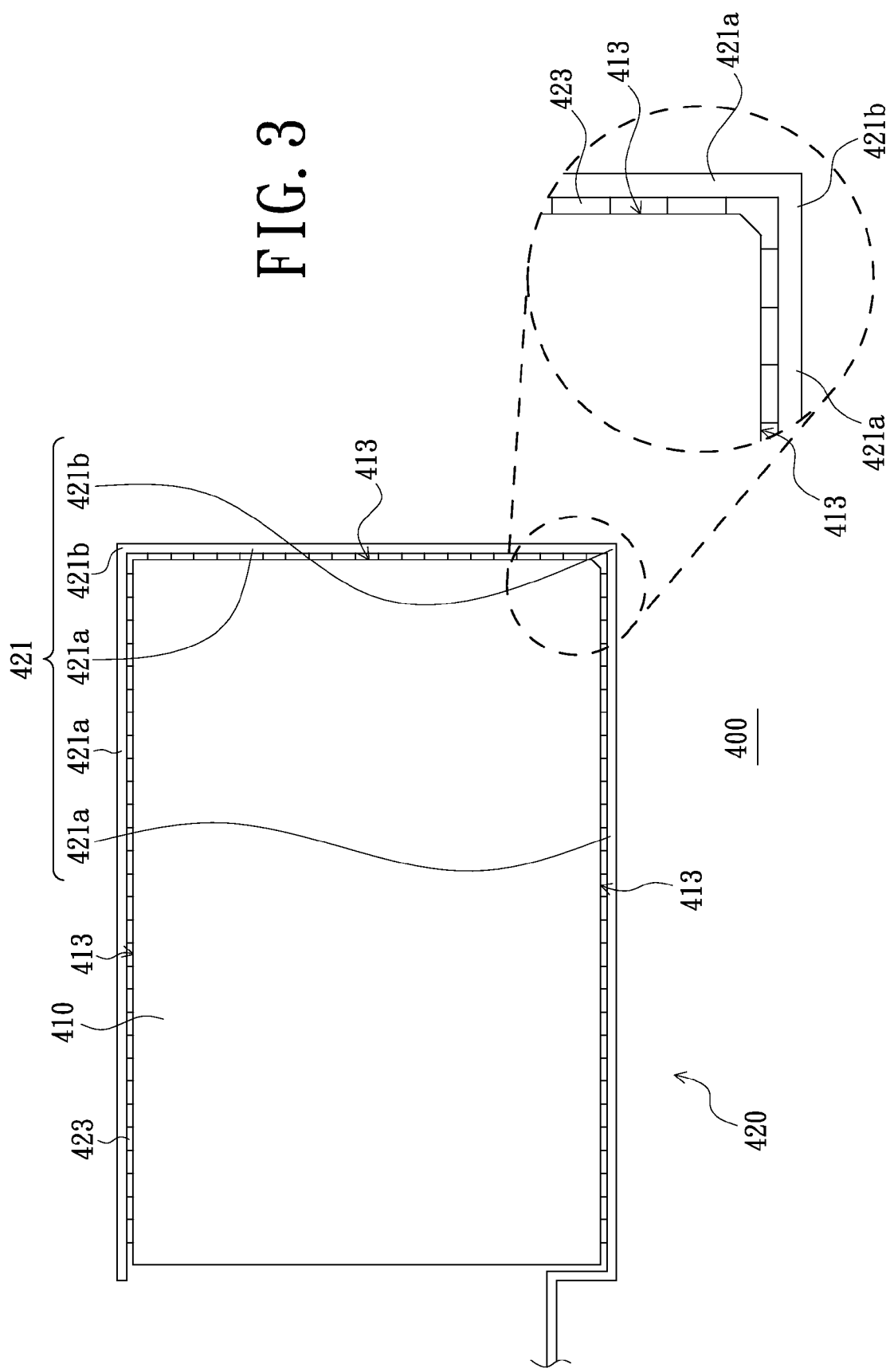

BACKLIGHT MODULE

CROSS-REFERENCES

This application claims priority to Taiwan application No. 098129460 filed on Sep. 1, 2009.

BACKGROUND

1. Field of the Invention

The present invention relates to a backlight module and particularly to a backlight module including a light guide plate having a plurality of side surfaces for light incidence.

2. Description of the Related Art

Currently, due to the global trend of energy-saving and environmental protection, light emitting diode (LED) elements gradually replace cold cathode fluorescence lamps (CCFL) in illumination applications such that mercury free and energy-saving light sources are produced.

Backlight modules can be categorized into direct type and edge type. However, the thickness of each of the conventional direct-type backlight modules is relatively large. In addition, light emitting diode elements can be used together with a light guide plate to form an edge-type backlight module. Single-edge-type backlight modules are common in edge-type backlight modules. In a single-edge-type backlight module, a plurality of light emitting diode elements are disposed at a side surface of a light guide plate. The side surface of the light guide plate which is corresponding to the light emitting diodes is the light incident surface and a top surface of the light guide plate is the light emitting surface. When the single-edge-type backlight module operates, the light emitted from the light emitting diode elements passes through the light incident surface to enter into the light guide plate. After affected by the light guide plate, the light is emitted out from the top surface.

However, in the single-edge-type backlight module, because the light only enters into the light guide plate from one side surface, the light guide plate is very thin and the number of the light emitting diode elements is limited, thus the brightness of the light emitting surface of single-edge-type backlight module can not be efficiently improved. Therefore, there is a desire to provide an edge-type backlight module of which the brightness is relatively high.

BRIEF SUMMARY

The present invention provides a backlight module of which the brightness of a light emitting top surface is relatively high.

The present invention provides a backlight module which includes a light guide plate and a flexible illuminating bar. The light guide plate includes a light emitting top surface and a plurality of light incident side surfaces. Each of the light incident side surfaces is connected to the light emitting top surface. The flexible illuminating bar includes a circuit board module and a plurality of point light sources. The circuit board module includes a plurality of circuit boards and at least one flexible electrical connection member. The circuit boards are disposed at the light incident side surfaces, respectively. The flexible electrical connection member electrically connects two of the circuit boards and is bendingly disposed between the corresponding two of the circuit boards. The point light sources are electrically disposed on the circuit boards and suitable for emitting light to the light incident side surfaces.

In one embodiment of the present invention, the flexible electrical connection member includes at least one electrical wire.

In one embodiment of the present invention, the flexible electrical connection member is a flexible circuit board.

In one embodiment of the present invention, each of the point light sources is a light emitting diode element.

The present invention also provides a backlight module which includes a light guide plate and a flexible illuminating bar. The light guide plate includes a light emitting top surface and a plurality of light incident side surfaces. Each of the light incident side surfaces is connected to the light emitting top surface. The flexible illuminating bar includes a flexible circuit board and a plurality of point light sources. The flexible circuit board includes a plurality of flexible carrying portions and at least one flexible connecting portion. The flexible carrying portions are disposed at the light incident side surfaces, respectively. The flexible connecting portion electrically connects two of the flexible carrying portions and is bendingly disposed between the corresponding two of the flexible carrying portions. The point light sources are electrically disposed on the flexible carrying portions and suitable for emitting light to the light incident side surfaces.

In one embodiment of the present invention, each of the point light sources is a light emitting diode element.

In the above backlight modules, the light can enter into the light guide plate via many light incident side surfaces, so more light can be introduced into the light guide plate. Accordingly, compared with the conventional single-edge-type backlight modules, the brightness of the light emitting top surface of each of the backlight modules of the present invention is improved.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

FIG. 1A is a schematic top view of a backlight module in accordance with the first embodiment of the present invention.

FIG. 3 is a schematic top view of a backlight module in accordance with the third embodiment of the present invention.

DETAILED DESCRIPTION

First Embodiment

Figure 1B:
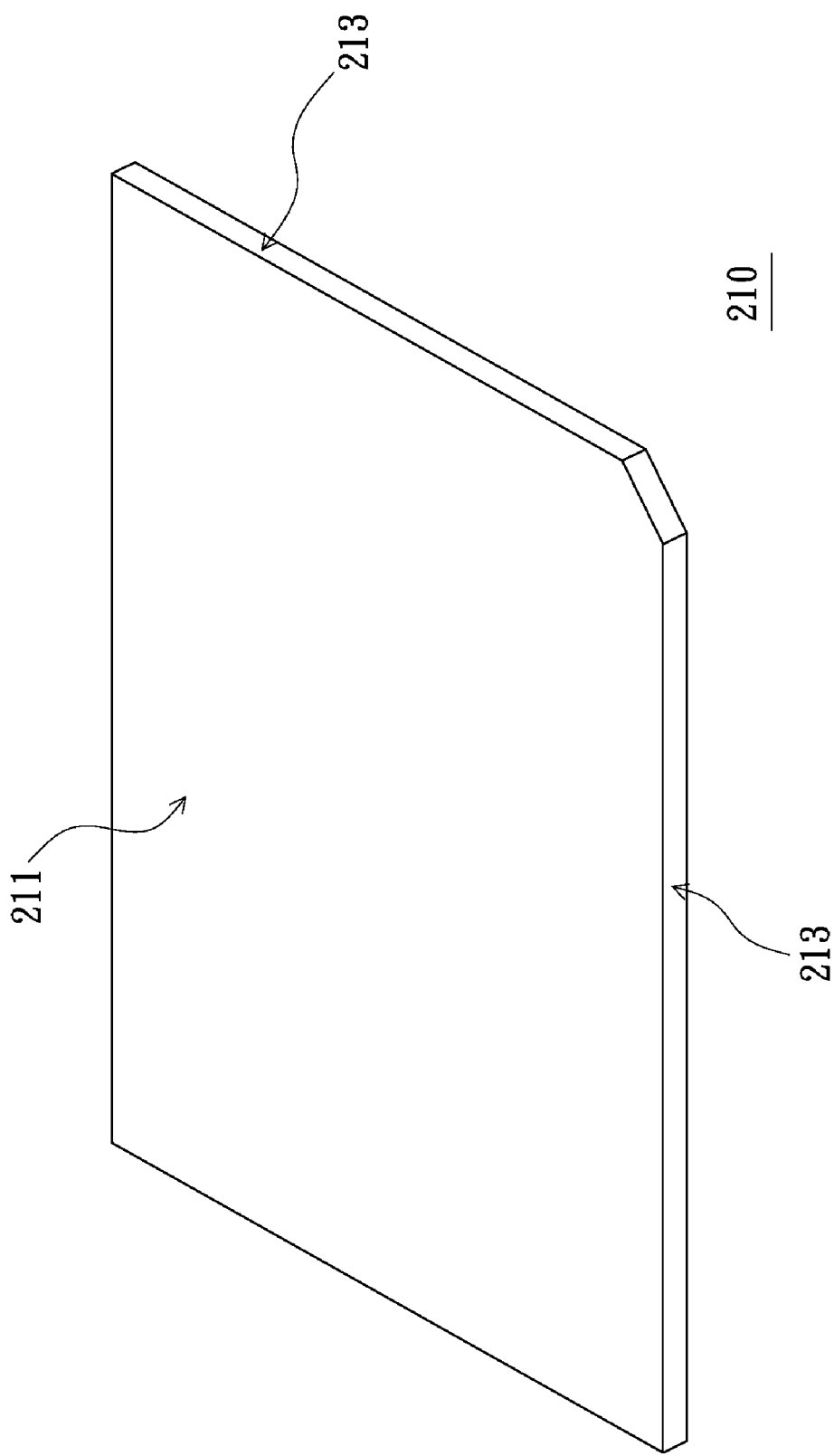
FIG. 1B is a three-dimensional schematic view of a light guide plate of FIG. 1A.

FIG. 1A is a schematic top view of a backlight module in accordance with the first embodiment of the present invention. FIG. 1B is a three-dimensional schematic view of a light guide plate of FIG. 1A. Referring to FIGS. 1A and 1B, a backlight module 200 of the present embodiment includes a light guide plate 210 and a flexible illuminating bar 220. The light guide plate 210 includes a light emitting top surface 211 and a plurality of light incident side surfaces 213. In the present embodiment, the light guide plate 210 includes two light incident side surfaces 213 and each of the light incident side surfaces 213 is connected to the light emitting top surface 211.

The flexible illuminating bar 220 includes a circuit board module 221 and a plurality of point light sources 223. The circuit board module 221 includes a plurality of circuit boards 221a and at least one flexible electrical connection member 221b. In the present embodiment, the circuit board module 221, for example, is L-shaped and includes two circuit boards 221a and a flexible electrical connection member 221b. The circuit boards 221a are disposed at the light incident side surfaces 213, respectively. It is noted that in the present embodiment, the flexibility of the circuit boards 221a is relatively low and even can be rigid. The flexible electrical connection member 221b, for example, includes at least one electrical wire. The flexible electrical connection member 221b is bendingly disposed between the circuit boards 221a and electrically connects the circuit boards 221. It is noted here that in another embodiment the flexible electrical connection member 221b can also be a flexible circuit board but it is not illustrated in the drawings.

The point light sources 223, for example, are light emitting diode elements. The point light sources 223 are electrically disposed on the circuit boards 221a and suitable for emitting light to the light incident side surfaces 213. In the present embodiment, part of the point light sources 223 are electrically disposed on one of the circuit boards 221a and suitable for emitting light to one of the light incident side surface 213. The other part of the point light sources 223 are electrically disposed on the other one of the circuit boards 221a and suitable for emitting light to another one of the light incident side surfaces 213. In the present embodiment, each of the point light sources 223 is disposed between the corresponding circuit board 221 and the corresponding light incident side surface 213.

When the backlight module 200 operates, light emitted from the point light sources 223 enters into the light guide plate 210 via the light incident side surfaces 213 and after affected by the light guide plate 210, the light is emitted out from the light emitting top surface 211 of the light guide plate 210.

According to above description, because the light can enter into the light guide plate 210 via many light incident side surfaces 213, thus compared with the conventional single-edge-type backlight modules, the brightness of the light emitting top surface 211 of the backlight module 200 is improved.

Second Embodiment

Figure 2:
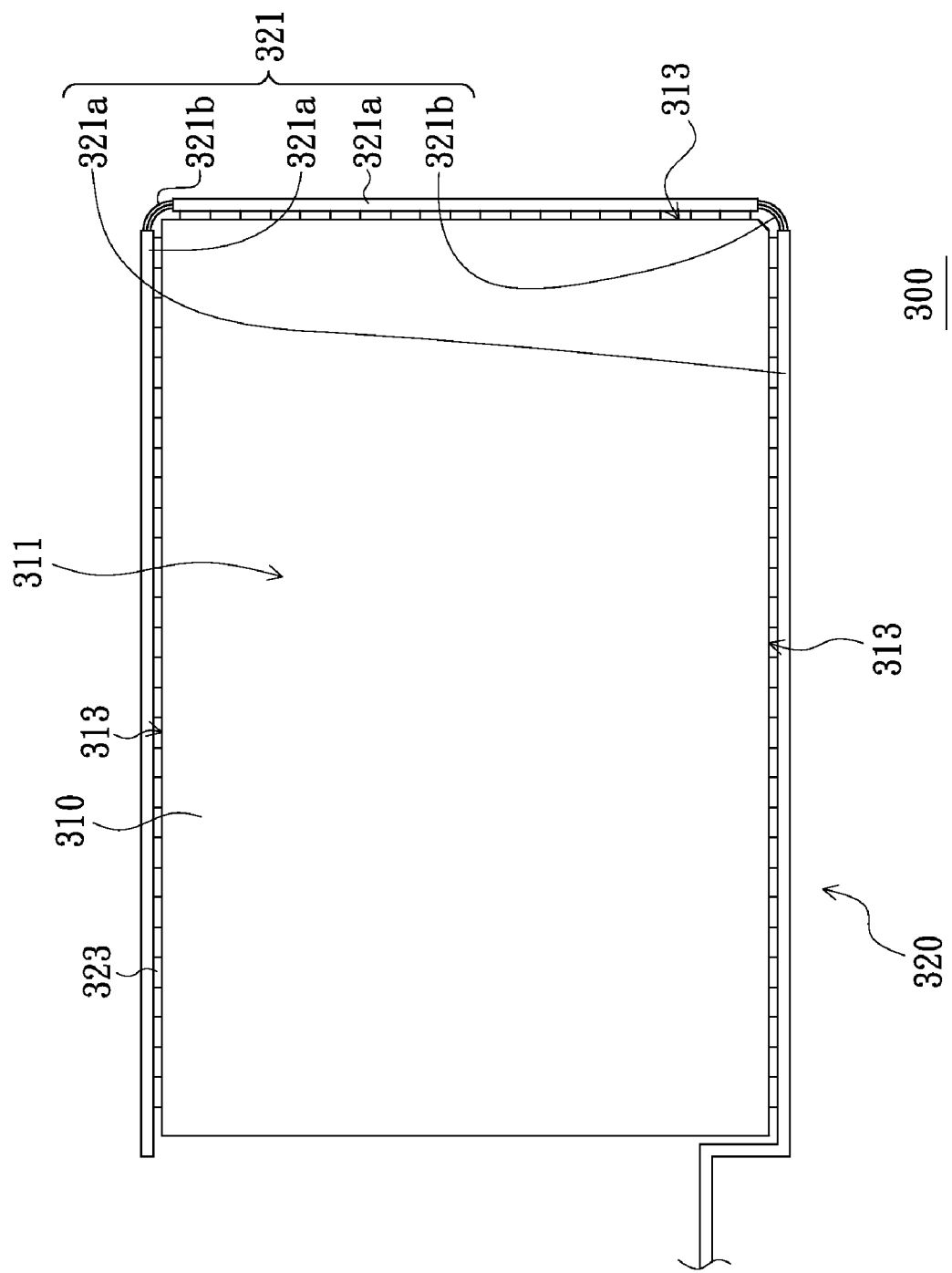
FIG. 2 is a schematic top view of a backlight module in accordance with the second embodiment of the present invention.

FIG. 2 is a schematic top view of a backlight module in accordance with the second embodiment of the present invention. Referring to FIG. 2, the difference between the backlight module 300 of the present embodiment and the backlight module 200 of the first embodiment lies in that the light guide plate 310 of the backlight module 300 of the present embodiment includes a light emitting top surface 311 and three light incident side surfaces 313 and that the circuit board module 321 of the flexible illuminating bar 320 of the present embodiment, for example, is U-shaped. The circuit board module 312 of the present embodiment includes three circuit boards 312a and two flexible electrical connection members 321b. The circuit boards 321a are disposed at the light incident side surfaces 313, respectively. Each of the flexible electrical connection members 321b electrically connects two of the circuit boards 321a and is bendingly disposed between the corresponding two of the circuit boards 321a.

The point light sources 323 are electrically disposed on the circuit boards 321a and suitable for emitting light to the light incident side surfaces 313. In the present embodiment, part of the point light sources 323 are electrically disposed on one of the circuit boards 321a and suitable for emitting light to one of the light incident side surfaces 313. Another part of the point light sources 323 are electrically disposed on another one of the circuit boards 321a and suitable for emitting light to another one of the light incident side surfaces 313. The other part of the point light sources 323 are electrically disposed on the other one of the circuit boards 321a and suitable for emitting light to the other one of the light incident side surfaces 313.

Third Embodiment

FIG. 3 is a schematic top view of a backlight module in accordance with the third embodiment of the present invention. As shown in FIG. 3, the difference between the backlight module 400 of the present embodiment and the backlight module 300 of the second embodiment lies in that the flexible illuminating bar 420 of the present embodiment includes a flexible circuit board 421 and a plurality of point light sources 423. The flexible circuit board 421 includes a plurality of flexible carrying portions 421a and at least one flexible connecting portion 421b. The flexible circuit board 421, for example, is U-shaped and includes three flexible carrying portions 421a and two flexible connecting portions 421b. The flexible carrying portions 421a are disposed at the light incident side surfaces 413 of the light guide plate 410, respectively. Each of the flexible connecting portions 421b electrically connects two of the flexible carrying portions 421a and is bendingly disposed between the corresponding two of the flexible carrying portions 421a.

The point light sources 423 are electrically disposed on the flexible carrying portions 421a and suitable for emitting light to the light incident side surfaces 413. Part of the point light sources 423 are electrically disposed on one of the flexible carrying portions 421a and suitable for emitting light to one of the light incident side surfaces 413. Another part of the point light sources 423 are electrically disposed on another one of the flexible carrying portions 421a and suitable for emitting light to another one of the light incident side surfaces 413. The other part of the point light sources 423 are electrically disposed on the other one of the flexible carrying portions 421a and suitable for emitting light to the other one of the light incident side surfaces 413.

As described above, the backlight modules in accordance with the embodiments of the present invention have at least following or other advantages. In each of the embodiments of the present invention, because the light can enter into the light guide plate via many light incident side surfaces, thus compared with the conventional single-edge-type backlight modules, the brightness of the light emitting top surface of each of the backlight modules of the embodiments of the present invention is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backlight module, comprising:
   a light guide plate, having a light emitting top surface and a plurality of light incident side surfaces, wherein at least two incident side surfaces are adjacent to each other, and each of the light incident side surfaces is connected to the light emitting top surface; and
   a flexible illuminating bar, comprising:

a circuit board module, comprising:
  a plurality of circuit boards disposed at the light incident side surfaces, respectively, so that at least two circuit boards are adjacent to each other; and
  at least one flexible electrical connection member electrically connecting two of the circuit boards and being bendingly disposed between the corresponding two of the circuit boards; and
a plurality of point light sources electrically disposed on the circuit boards and suitable for emitting light to the light incident side surfaces.

2. The backlight module of claim 1, wherein the flexible electrical connection member comprises at least one electrical wire.

3. The backlight module of claim 1, wherein the flexible electrical connection member is a flexible circuit board.

4. The backlight module of claim 1, wherein each of the point light sources is a light emitting diode element.

5. The backlight module of claim 1, wherein the at least two adjacent incident side surfaces are perpendicular to each other.

6. A backlight module, comprising:
  a light guide plate, having a light emitting top surface and a plurality of light incident side surfaces, wherein at least two incident side surfaces are adjacent to each other, and each of the light incident side surfaces is connected to the light emitting top surface; and
  a flexible illuminating bar, comprising:
    a flexible circuit board, comprising:
      a plurality of flexible carrying portions disposed at the light incident side surfaces, respectively, so that at least two flexible carrying portions are adjacent to each other; and
      at least one flexible connecting portion electrically connecting two of the flexible carrying portions and being bendingly disposed between the corresponding two of the flexible carrying portions; and
    a plurality of point light sources electrically disposed on the flexible carrying portions and suitable for emitting light to the light incident side surfaces.

7. The backlight module of claim 6, wherein each of the point light sources is a light emitting diode element.

8. The backlight module of claim 6, wherein the at least two adjacent incident side surfaces are perpendicular to each other.

* * * * *

UNITED STATES PATENT AND TRADEMARK OFFICE
CERTIFICATE OF CORRECTION

PATENT NO. : 8,147,114 B2  
APPLICATION NO. : 12/699030  
DATED : April 3, 2012  
INVENTOR(S) : Lin et al.

Page 1 of 1

It is certified that error appears in the above-identified patent and that said Letters Patent is hereby corrected as shown below:

On the title page, item:

(75) Inventors: Yu-Sheng Lin, (Hsinchu, TW);  
Wan-Ten Chen, (Hsinchu, TW);  
Chih-Hua Cheng, (Hsinchu, TW);  
Yi-Ting Chen, (Hsinchu, TW);  
Yung-Ta Huang, (Hsinchu, TW);  
Shin-Yi Hsieh, (Hsinchu, TW)

should be

(75) Inventors: Yu-Sheng Lin, (Hsinchu, TW);  
Wan-Tien Chen, (Hsinchu, TW);  
Chih-Hua Cheng, (Hsinchu, TW);  
Yi-Ting Chen, (Hsinchu, TW);  
Yung-Ta Huang, (Hsinchu, TW);  
Shin-Yi Hsieh, (Hsinchu, TW)

Signed and Sealed this  
Twenty-fourth Day of July, 2012

David J. Kappos  
*Director of the United States Patent and Trademark Office*